United States Patent
Miki

(10) Patent No.: US 8,134,718 B2
(45) Date of Patent: Mar. 13, 2012

(54) OPTICAL DISPLACEMENT MEASURING INSTRUMENT

(75) Inventor: Yutaka Miki, Kawasaki (JP)

(73) Assignee: Mitutoyo Corporation, Kanagawa (JP)

( * ) Notice: Subject to any disclaimer, the term of this patent is extended or adjusted under 35 U.S.C. 154(b) by 464 days.

(21) Appl. No.: 12/481,040

(22) Filed: Jun. 9, 2009

(65) Prior Publication Data

US 2009/0310147 A1    Dec. 17, 2009

(30) Foreign Application Priority Data

Jun. 13, 2008    (JP) .................................. 2008-155283

(51) Int. Cl.
*G01B 11/14*    (2006.01)

(52) U.S. Cl. ........................................ 356/624; 356/614

(58) Field of Classification Search ........................ None
See application file for complete search history.

(56) References Cited

U.S. PATENT DOCUMENTS

| 4,713,533 A | 12/1987 | Bremer et al. |
| 4,969,005 A | 11/1990 | Tokunaga |
| 2001/0014060 A1 | 8/2001 | Freeman et al. |
| 2008/0285254 A1 | 11/2008 | Shimokawa et al. |

FOREIGN PATENT DOCUMENTS

| JP | 8-128806 | 5/1996 |
| JP | 2007-332296 | 12/2007 |
| JP | 2009-156613 | 7/2009 |

OTHER PUBLICATIONS

English language Abstract of JP 8-128806, May 21, 1996.
English language Abstract of JP 2007-332296, Dec. 27, 2007.
English language Abstract of JP 8-128806, May 21, 1996.
English language Abstract of JP 2007-332296, Dec. 27, 2007.

*Primary Examiner* — Gregory J Toatley
*Assistant Examiner* — Amanda Merlino
(74) *Attorney, Agent, or Firm* — Greenblum & Bernstein, P.L.C.

(57) ABSTRACT

A first light detector and a second light detector, in each of which a plurality of light-receiving elements are arranged in an adjoining manner, are respectively provided anterior to an image-forming point of first reflected light and posterior to an image-forming point of second reflected light. A focal-point detecting circuit includes: maximum value selectors for selecting the maximum values from sums of light-receiving signals from adjoining light-receiving elements of the first light detector and the second light detector respectively; a total value operator for obtaining the total value of light-receiving signals from all the light-receiving elements of each of the first light detector and the second light detector; a light-detecting-signal operator for obtaining light-detecting signals by subtracting the maximum values from the total values; and an error-signal operational circuit for outputting a difference between the light-detecting signals to a servo circuit as a signal based on an amount of displacement between a focal point and a measuring face.

6 Claims, 10 Drawing Sheets

OPTICAL DISPLACEMENT MEASURING INSTRUMENT

BACKGROUND OF THE INVENTION

1. Field of the Invention

The present invention relates to an optical displacement measuring instrument that moves an objective lens or a focusing lens so as to bring a focal point into coincidence with a measuring face, for measuring a profile of the measuring face based on a movement of the objective lens or the focusing lens.

2. Description of Related Art

Conventionally, an arrangement for irradiating light onto a measuring face and measuring a profile of the measuring face has been known (for instance, see a document 1: JP-A-8-128806).

According to the arrangement disclosed in the document 1, a space filter is disposed in an optical path between a signal detecting optical system and a beam splitter. Adjacent to the center of the space filter, a shield is provided. By guiding reflected light from a surface of an object to the shield, a light volume of the reflected light near its optical axis is shielded or reduced, so that a ratio of the maximum value to the minimum value of a light volume of received light detected by the signal detecting optical system is decreased, thereby preventing a decrease in SN ratio.

However, when a profile of a target object exemplarily includes such a curved surface that a slanting angle of its measuring face is larger than a convergent angle of convergent light converged by a lens and incident on the measuring face, the arrangement according to the above-described document 1 may not favorably measure the profile of the target object.

Specifically, according to the arrangement of the document 1, as shown in FIG. 9, convergent light L902 generated by converging parallel light L901 with an objective lens 800 and incident on a target object 900 is reflected on a measuring face 901, thereby forming reflected light L903. When a slanting angle θ11 of the measuring face 901 is equal to a convergent angle θ21 of the convergent light L902, only an outer edge of the convergent light L902 (hereinafter called as convergent-light outer edge) and an outer edge of the reflected light L903 (hereinafter called as reflected-light outer edge) are overlapped while the convergent light L902 and the reflected light L903 are not overlapped at any other portion. In other words, an angle formed between the convergent-light outer edge L902A and the reflected-light outer edge L903A is 0 degree. At this time, the reflected-light outer edge L903A overlapped with the convergent light L902 proceeds along an outer edge L901A of the parallel light L901 (hereinafter called as parallel-light outer edge), so that the reflected-light outer edge L903A cannot be used for detecting a focusing point of a received beam of light.

In addition, as shown in FIG. 10, when the slanting angle θ12 of the measuring face 911 of the target object 910 is larger than the convergent angle θ21 of the convergent light L902, the convergent light L902 and the reflected light L911 are not overlapped with each other. In other words, the angle formed between the convergent-light outer edge L902A and the reflected-light outer edge L911A is less than 0 degree. At this time, the reflected-light outer edge L911A passes through the objective lens 800 and subsequently proceeds at a position external to the parallel-light outer edge L901A, so that the reflected-light outer edge L911A cannot be used as the received beam of light.

Therefore, the angle formed between the irradiating beam and the received beam of light is 0 degree in such an arrangement as shown in FIG. 9 while no received beam of light is present in such an arrangement as shown in FIG. 10. Thus, sensitivity for detecting a focusing point is lost.

When the sensitivity for detecting a focusing point is lost and a profile of the target object in which a curved surface is included (e.g., spherical or columnar object) is attempted to be followed, positioning of a focusing lens may be erroneously controlled so that an extension of a measuring beam constantly penetrates the curvature center of the measuring face, at portions where the slanting angle of the measuring face is larger than the convergent angle of the convergent light. Thus, in a profile measurement record, record corresponding to the portions where the slanting angle of the measuring face is larger than the convergent angle of the convergent light may erroneously show that the portions are obliquely bulged or recessed from the measuring face, so that only useless record may be obtained.

In view of the above, the applicant has previously proposed an optical displacement measuring instrument for improvement (see a document 2: Japanese Patent Application No. 2007-332296).

The arrangement according to the document 2 includes: a light splitter for splitting reflected light having reflected on the measuring face and having passed through the objective lens into two split light of first reflected light and second reflected light; a first light-receiving element array and a second light-receiving element array respectively disposed anterior to a focal point of the first reflected light and posterior to a focal point of the second reflected light, a plurality of pixels being two-dimensionally aligned in each of the first light-receiving element array and the second light-receiving element array; a light-receiving signal operator that, among light-receiving signals from a plurality of pixels within an area predetermined in each of the first light-receiving element array and the second light-receiving element array, excepts light-receiving signals from pixels having the highest brightness to the nth highest brightness (n being an integer) and obtains a total value of light-receiving signals from the remaining pixels; and a servo circuit for driving a moving unit so that the total value of the light-receiving signals of the first light-receiving element array obtained by the light-receiving signal operator becomes equal to the total value of the light-receiving signals of the second light-receiving element array obtained by the light-receiving signal operator, the driving of the moving unit bringing the focal point of the objective lens into coincidence with the measuring face.

According to such an arrangement, the convergent light illuminated on the measuring face by the objective lens is specularly and diffusely reflected on the measuring face. The specularly-reflected light and the diffusely-reflected light pass through the objective lens and the like to be subsequently received by the pixels in the first light-receiving element array and the second light-receiving element array.

Then, among the light-receiving signals from the plurality of pixels within the area predetermined in each of the first light-receiving element array and the second light-receiving element array, the light-receiving signals from the pixels of the highest brightness to the nth highest brightness (n being an integer) are excepted for focusing. In other words, focusing is performed based on the darker diffusely-reflected light with exclusion of the specularly-reflected light from the measuring face (i.e., with the brightest pixel being masked). Thus, focusing can be correctly performed. Accordingly, it is possible to prevent a bulging and a recess that are not present in the profile of the measuring face from being generated by false focusing.

However, since the optical displacement measuring instrument according to the document 2 performs the above processings with use of CCD (solid-state image sensor) as the light-receiving element arrays, improvements in the following points are envisaged at the time of practically applying the optical displacement measuring instrument:

(a) due to speckle, diffraction and the like originated from a material and surface irregularities of the target object, the pixels to be masked (i.e. the pixels having the highest brightness to the nth highest brightness among the light-receiving signals) may be discontinuously located, thereby affecting the measurement accuracy;

(b) a complex digital circuit is required for selecting the pixels to be masked (i.e., the pixels having the highest brightness to the nth highest brightness among the light-receiving signals); and (c) when a measuring instrument that uses doughnut-shaped beam is used and the measuring face is slanted at an angle smaller than the limit angle, the majority of the beam may be masked, so that the applicability may be restricted.

SUMMARY OF THE INVENTION

In view of the above, an object of the invention is to provide an optical displacement measuring instrument capable of favorably measuring a target object of which measuring face is, for instance, slanted or curved.

An optical displacement measuring instrument according to an aspect of the invention includes: a light source; a collimating lens that collimates light from the light source and outputs the light as parallel light; an objective lens that converges the parallel light from the collimating lens, illuminates the converged light onto a measuring face of a target object and receives reflected light from the measuring face; a moving unit that moves the objective lens or a focusing lens disposed between the objective lens and the light source along an optical axis; a position detector that detects a position of the objective lens or a position of the focusing lens; and a focusing unit that recognizes a positional displacement between a focal point of the objective lens and the measuring face based on reflected light and drives the moving unit to bring the focal point of the objective lens into coincidence with the measuring face, the reflected light having been reflected on the measuring face and having passed though the objective lens, in which the focusing unit includes: a light splitter for splitting the reflected light having been reflected on the measuring face and having passed through the objective lens into two split light of first reflected light and second reflected light; a first light detector and a second light detector respectively disposed anterior to an image-forming point of the first reflected light and posterior to an image-forming point of the second reflected light, a plurality of light-receiving elements being arranged in a manner adjoining to each other along at least an outer circumference of a light-receiving region in each of the first light detector and the second light detector; a focal-point detector that obtains an amount of displacement between the focal point of the objective lens and the measuring face based on a light-receiving signal obtained with the first light detector and a light-receiving signal obtained with the second light detector; and a servo circuit for driving the moving unit so that the amount of the displacement obtained by the focal-point detector is canceled, the driving of the moving unit bringing the focal point of the objective lens into coincidence with the measuring face, and the focal-point detector includes: a first maximum-value selector that selects a maximum value from sums of the light-receiving signals from adjoining light-receiving elements of either one of the first light detector and the second light detector; a second maximum-value selector that deems a sum of the light-receiving signals from adjoining light-receiving elements of the other one of the first light detector and the second light detector as a maximum value and selects the deemed sum as the maximum value, the adjoining light-receiving elements of the other one of the first light detector and the second light detector being positioned symmetrically to the adjoining light-receiving elements that provide the maximum value selected by the first maximum-value selector with respect to the image-forming point; a total-value operator that obtains a total value of the light receiving signals from all the light-receiving elements of each of the first light detector and the second light detector; a light-detecting-signal operator that obtains a light-detecting signal by subtracting the maximum value from the total value for each of the first light detector and the second light detector; and an error-signal operator that outputs the difference between the light-detecting signals obtained by the light-detecting-signal operator to the servo circuit as a signal based on the amount of the displacement between the focal point and the measuring face.

According to this arrangement, the light from the light source is collimated by the collimating lens to be parallel light and incident on the objective lens. Then, the objective lens converges the parallel light and illuminates the converged parallel light on the measuring face of the target object. The reflected light reflected by the measuring face passes through the objective lens to be received by the focusing unit. The focusing unit moves the moving unit based on the reflected light having passed through the objective lens so as to bring the focal point of the objective lens into coincidence with the measuring face. Accordingly, since the objective lens or the focusing lens is moved in accordance with the profile of the measuring face so that the focal point of the objective lens is brought into coincidence with the measuring face, the profile of the measuring face can be measured by reading the position of the objective lens or the focusing lens with the position detector.

According to the aspect of the invention, the reflected light having passed through the objective lens is split by the focusing unit into two split light, and the two split light are received by the first light detector and the second light detector respectively. At this time, the first maximum-value selector selects the maximum value from the sums of the light-receiving signals from the adjoining light-receiving elements of either one of the first light detector and the second light detector. Then, the sum of the light-receiving signals from the adjoining light-receiving elements of the other one of the first light detector and the second light detector, which are positioned symmetrically to the adjoining light-receiving elements that provide the maximum value selected by the first maximum value selector, is deemed and selected as the maximum value (by the second maximum-value selector).

The total-value operator obtains the total value of the light-receiving signals from all the light-receiving elements of each of the first light detector and the second light detector, so that the light-detecting-signal operator obtains the light-detecting signal by subtracting the maximum value from the total value for each of the first light detector and the second light detector. Subsequently, the error-signal operator outputs the difference between the light-detecting signals obtained by the light-detecting-signal operator to the servo circuit as a signal based on the amount of the displacement between the focal point and the measuring face. Resultantly, the moving unit controls the position of the objective lens or the position of the focusing lens so that the difference between the light-detecting signals is canceled.

The convergent light illuminated on the measuring face by the objective lens is specularly and diffusely reflected on the measuring face. The specularly-reflected light and the diffusely-reflected light pass through the objective lens and the like to be subsequently received by the first light detector and the second light detector.

Exemplarily when the measuring face is slanted while the angle between the outer edge of the convergent light and the reflected light (specularly-reflected light) from the measuring face is approximately zero, the specularly-reflected light from the measuring face is only partially received by the first light detector and the second light detector. As a consequence, false focusing may generate a bulging and a recess that are not present in the profile of the measuring face.

According to the aspect of the invention, the light-detecting signal of each of the first light detector and the second light detector is obtained by subtracting the maximum value of the sums of the light-receiving signals from the adjoining light-receiving elements from the total value of the light-receiving signals from all the light-receiving elements. In other words, with exclusion of a sum of light-receiving signals from adjoining light-receiving elements that have received the specularly-reflected light (i.e., with the specularly-reflected light being masked), the focusing is conducted based on the darker diffusely-reflected light. Therefore, correct focusing can be conducted. Accordingly, it is possible to prevent a bulging and a recess that are not present in the profile of the measuring face from being generated by false focusing.

In addition, since the maximum value of the sums of the light-receiving signals from the adjoining sets of the light-receiving elements included in each of the first light detector and the second light detector is excluded from the total value, the following advantages can be also obtained: (a) it is possible to prevent discontinuous masking of pixels due to speckle, diffraction and the like; (b) it is not required to prepare a complex digital circuit for selecting the pixels to be masked; and (c) even when a gauge that uses doughnut-shaped beam is used and the measuring face is slanted at an angle smaller than the limit angle, it is possible to prevent the majority of the beam from being masked.

Preferably in the aspect of the invention, a plurality of fan-shaped light-receiving elements are annularly arranged in an adjoining manner in each of the first light detector and the second light detector.

The "fan-shape" includes not only a typical shape defined by two straight lines radially spread from the center while forming a predetermined angle therebetween and an arc connecting the outer ends of the straight lines together and described around the center, but also a trapezoidal sector shape formed by cutting away the center portion of such a typical shape.

With this arrangement, no matter in which direction the measuring face is slanted, correct focusing can be conducted. In other words, errors due to slant of the measuring face can be reduced.

Preferably in the aspect of the invention, each of the first light detector and the second light detector is provided by a split photodiode.

At this time, each of the first light detector and the second light detector preferably includes three or more light-receiving elements.

According to the aspect of the invention, a commercially-available split diode is usable, thereby contributing cost reduction. Furthermore, the use of a photodiode allows an analogue-circuit processing and high-speed processing. For comparison, a conventional arrangement (arrangement disclosed in the document 2), for which a digital circuit is indispensable, requires the use of light-receiving elements such as low-speed CCD or C-MOS, so that the responsiveness may be reduced. However, the invention is free from such responsiveness reduction.

DETAILED DESCRIPTION OF PREFERRED EMBODIMENT(S)

Arrangement of Optical Displacement Measuring Instrument

Figure 1:
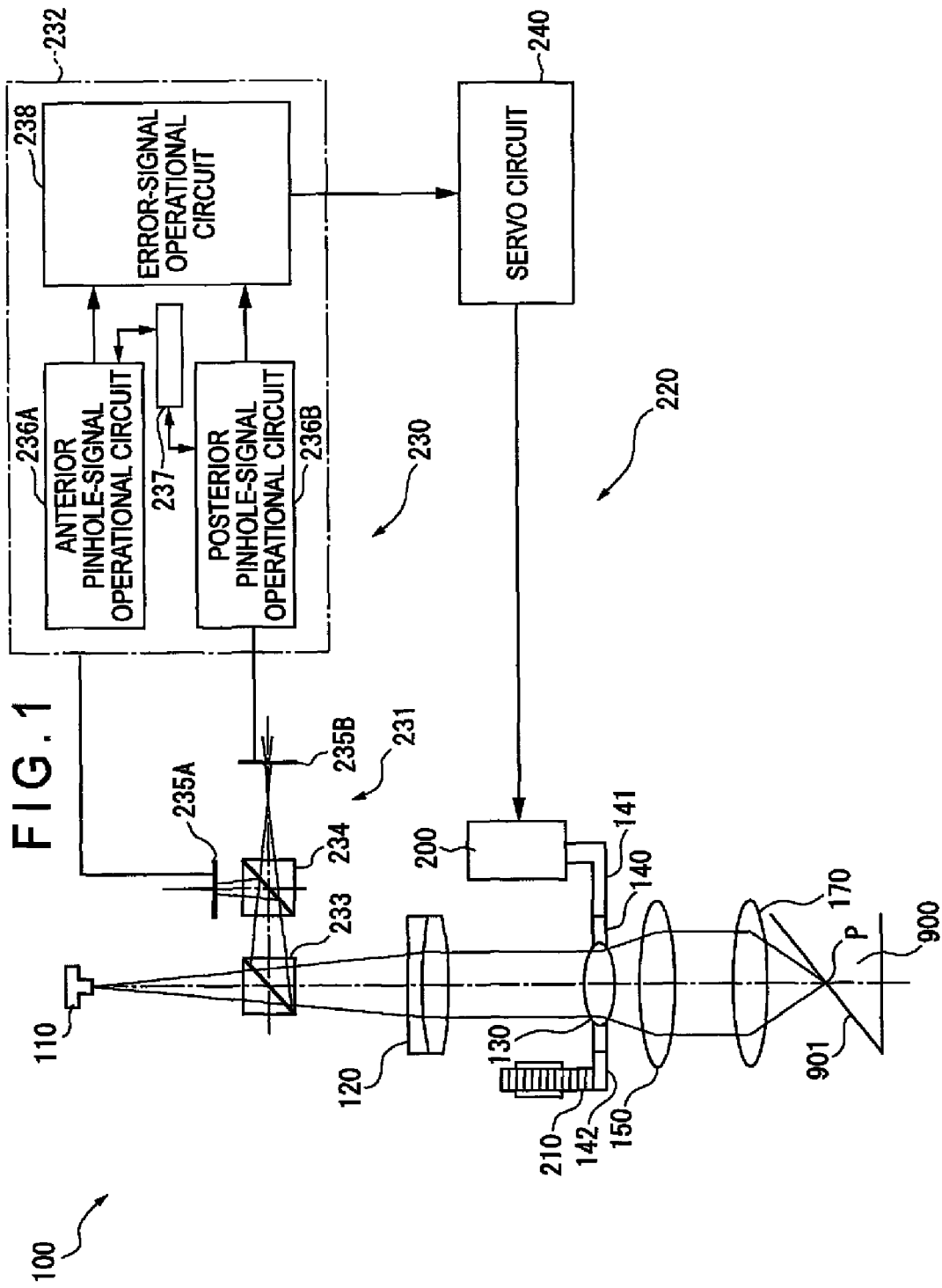
FIG. 1 schematically shows an arrangement of an optical displacement measuring instrument according to an exemplary embodiment of the invention.

FIG. 1 schematically shows an arrangement of an optical displacement measuring instrument according to an exemplary embodiment of the invention.

As shown in FIG. 1, the optical displacement measuring instrument 100 includes: a light source 110; a first collimating lens 120 for collimating light from the light source 110 and outputting the light as parallel light; a focusing lens 130 for diverging the parallel light from the first collimating lens 120 and outputting the light as diverging light; a second collimating lens 150 for collimating the diverging light from the focusing lens 130 and outputting the light as parallel light; an objective lens 170; an actuator 200 (moving unit) for moving the focusing lens 130 along the optical axis; a linear encoder 210 (position detector) for detecting a position of the focusing lens 130; and a focusing unit 220 for recognizing positional displacement between a focal point of the objective lens 170 and a measuring face 901 based on a focal point of reflected light having been reflected from the measuring face 901 and having passed through the objective lens 170, the second collimating lens 150, the focusing lens 130 and the first collimating lens 120 and for controlling the position of the focusing lens 130 with the actuator 200 so as to bring the focal point of the objective lens 170 into coincidence with the measuring face 901.

The light source 110 may be, for instance, a laser element.

The light source 110 and the first collimating lens 120 are spaced apart from each other by a predetermined distance so as to allow the light from the light source 110 to be collimated and outputted as the parallel light by the first collimating lens 120.

The focusing lens 130 is disposed to oppose to the first collimating lens 120 and the second collimating lens 150. A periphery of the focusing lens 130 is supported by a lens holder 140. The lens holder 140, which is linked to the actuator 200 via an arm 141, is displaceable along the optical axis of the focusing lens 130. On the other hand, the lens holder 140 is also linked to the linear encoder 210 via a connector 142. In other words, the focusing lens 130 is disposed in such a manner that distances respectively from the first collimating lens 120 and the second collimating lens 150 are changeable.

The second collimating lens 150 is disposed to oppose to the objective lens 170 while being spaced apart from the objective lens 170 by a predetermined distance.

The objective lens 170 illuminates the parallel light outputted from the second collimating lens 150 onto the measuring face 901 as convergent light while outputting the reflected light from the measuring face 901 to the second collimating lens 150.

The focusing unit 220 includes: a focal point detector 230 for detecting a focal point; and a servo circuit 240 for controlling the actuator 200 based on a signal from the focal point detector 230.

The focal point detector 230 includes: a focal-point detecting optical system 231 for detecting the focal point by a pseudo-pinhole method; and a focal-point detecting circuit 232 (focal-point detector) for obtaining a positional relationship between the focusing lens 130 and the measuring face 901 based on a signal from the focal-point detecting optical system 231.

The focal-point detecting optical system 231 includes: a first beam splitter 233 disposed between the light source 110 and the first collimating lens 120 for splitting light from the first collimating lens 120; a second beam splitter 234 (light splitter) for splitting light from the first beam splitter 233 into two split light of first reflected light and second reflected light; a first light detector 235A disposed anterior to a focusing point (image-forming point) of the first reflected light; and a second light detector 235B disposed posterior to a focusing point (image-forming point) of the second reflected light.

Figure 2:
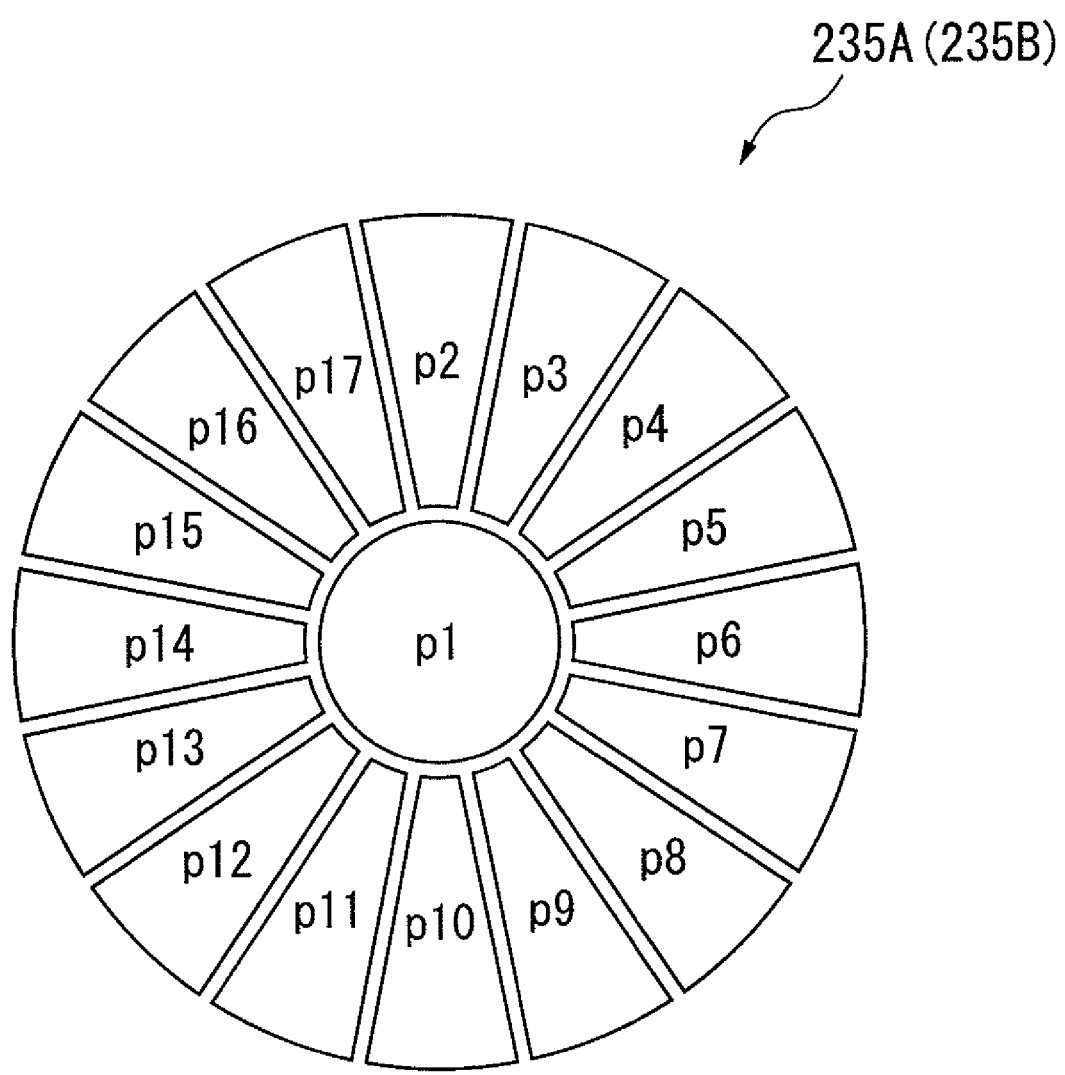
FIG. 2 shows a light-receiving element of a light detector according to the exemplary embodiment.

As shown in FIG. 2, the first light detector 235A and the second light detector 235B are each structured such that one circular light-receiving element p1 is centrally disposed while a plurality of fan-shaped light-receiving elements p2 to p17 (sixteen elements) are annularly arranged around the outer circumference of the light-receiving element p1 in a manner adjoining to each other. Specifically, the first light detector 235A and the second light detector 235B are each provided by a 17-part split photodiode structured such that the light-receiving element p1 is placed at the center of a circular light-receiving region equivalent to a pseudo-pinhole while the plurality of fan-shaped light-receiving elements p2 to p17 are annularly arranged along the outer circumference of the light-receiving region in a manner adjoining to each other.

The light-receiving element p1 is circularly shaped. The light-receiving elements p2 to p17 are each shaped in a so-called trapezoidal sector defined by: two straight lines radially spread from the center of the light-receiving region while forming a predetermined angle (22.5 degrees) therebetween; an arc connecting the outer ends of the straight lines together and described around the center of the light-receiving region; and an arc connecting the inner ends of the straight lines together and described around the center of the light-receiving region.

Accordingly, in each of the first light detector 235A and the second light detector 235B, the sum of light-receiving signals from the light-receiving elements p1 to p17 disposed within the circular light-receiving region equivalent to the pseudo-pinhole can be deemed as a pinhole-equivalent signal.

The focal-point detecting circuit 232 includes: an anterior pinhole-signal operational circuit 236A for obtaining a light-detecting signal with exclusion of local signals, based on the light-receiving signal from the first light detector 235A (i.e., for obtaining an anterior pinhole signal); a posterior pinhole-signal operational circuit 236B for obtaining a light-detecting signal with exclusion of local signals, based on the light-receiving signal from the second light detector 235B (i.e., for obtaining a posterior pinhole signal); a second maximum-value selector 237; and an error-signal operational circuit 238 (error-signal operator) for outputting a difference between the anterior pinhole signal from the anterior pinhole-signal operational circuit 236A and the posterior pinhole signal from the posterior pinhole-signal operational circuit 236B to the servo circuit 240 as a signal based on an amount of displacement between the focal point of the objective lens 170 and the measuring face (focusing-error signal).

Figure 3:
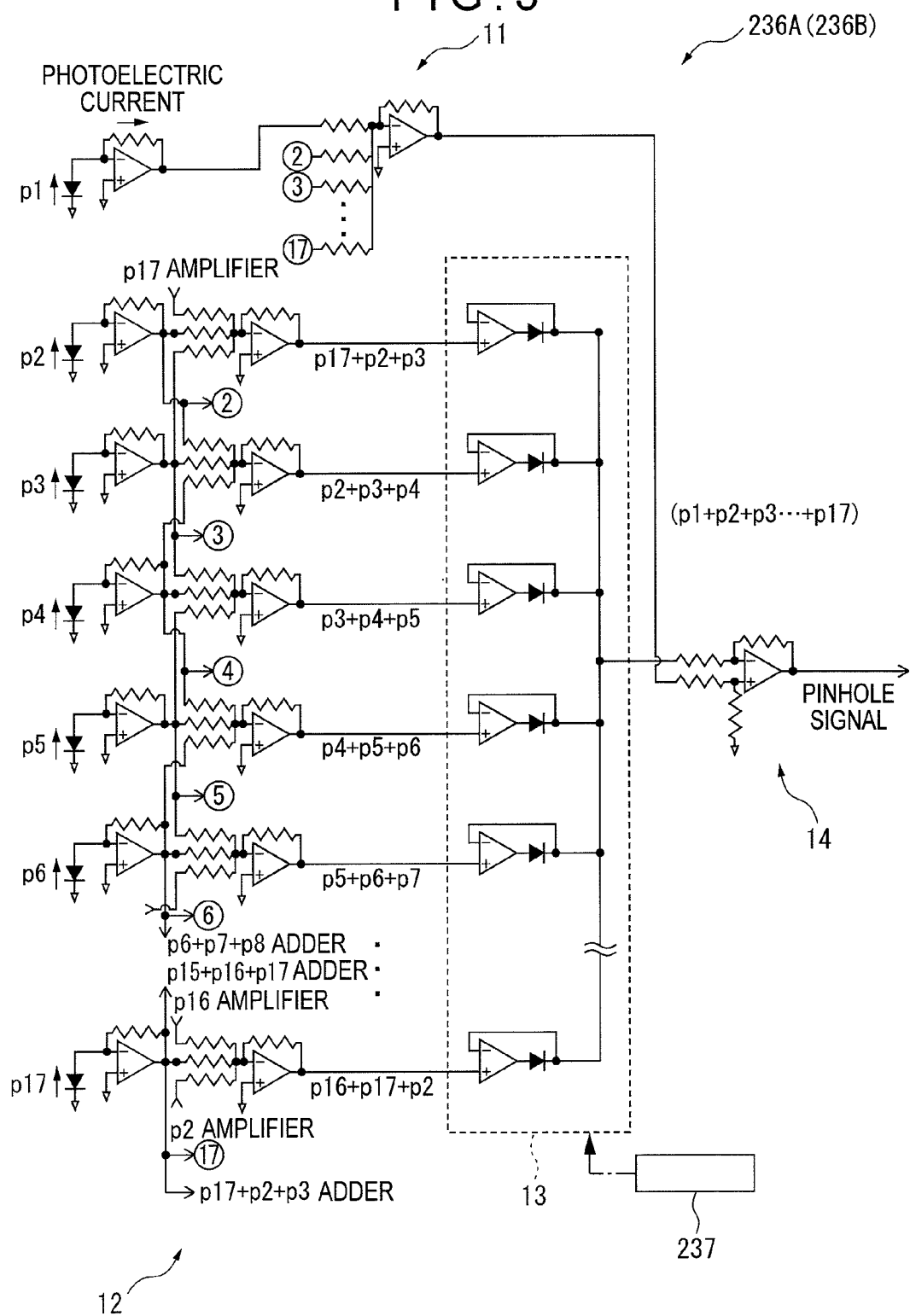
FIG. 3 shows a pinhole-signal operational circuit according to the exemplary embodiment.

The anterior pinhole-signal operational circuit 236A and the posterior pinhole-signal operational circuit 236B are basically configured in the same manner. FIG. 3 shows an exemplary circuit configuration employed in the anterior pinhole-signal operational circuit 236A and the posterior pinhole-signal operational circuit 236B.

As shown in FIG. 3, the exemplary circuit configuration includes: a total-value operator 11 for obtaining the total value of the light-receiving signals from all the light-receiving elements p1 to p17 included in the first light detector 235A and the second light detector 235B; adjoining-light-receiving-element operators 12 each for obtaining the sum of the light-receiving signals from the plurality of adjoining light-receiving elements (in this embodiment, three adjoining light-receiving elements) such as the adjoining elements (p17, p2, p3), (p2, p3, p4), ... or (p16, p17, p2), among the fan-shaped light-receiving elements p2 to p17 included in the first light detector 235A and the second light detector 235B; a first maximum-value selector 13 for selecting the maximum value from the sums of the light-receiving signals from the adjoining light-receiving elements; and a light-detecting-signal operator 14 for obtaining the anterior pinhole signal and the posterior pinhole signal by subtracting the maximum value from the total value.

The total-value operator 11 and the adjoining-light-receiving-element operators 12 each include: an adder provided by an operational amplifier; and an amplifier. The first maximum-value selector 13 includes an operational amplifier and diode. The light-detecting-signal operator 14 includes an adder provided by an operational amplifier.

As regards the first light detector 235A and the second light detector 235B, the light-receiving elements p1 to p17 symmetrically positioned with respect to the image-forming point are required to be masked. Thus, the selection of the three light-receiving elements by the first maximum-value selector 13 is exemplarily conducted only in the anterior pinhole-signal operational circuit 236A. On the other hand, in the posterior pinhole-signal operational circuit 236B, the light-receiving elements symmetric thereto with respect to the image-forming point are selected by the second maximum-value selector 237 depending on the result of the selection by the first maximum-value selector 13, so that such symmetric light-receiving elements are to be excluded (masked).

Specifically, when the maximum-value selector 13 of the anterior pinhole-signal operational circuit 236A selects the sum of the light-receiving signals from certain adjoining light-receiving elements of the first light detector 235A as the maximum value, the second maximum-value selector 237 deems as the maximum value the sum of the light-receiving signals from adjoining light-receiving elements of the second light detector 235B which are positioned symmetrically to the certain adjoining light-receiving elements with respect to the image-forming point. Then, the second maximum-value selector 237 selects the sum as the maximum value. Alternatively, instead of selecting the sum of the light-receiving signals from the certain adjoining light-receiving elements of the first light detector 235A as the maximum value by the maximum-value selector 13 of the anterior pinhole-signal operational circuit 236A, the maximum-value selector 13 of the posterior pinhole-signal operational circuit 236B may select the sum of the light-receiving signals from certain adjoining light-receiving elements of the second light detector 235B as the maximum value. When the maximum-value selector 13 of the posterior pinhole-signal operational circuit 236B is used, the second maximum-value selector 237 selects as the maximum value the sum of the light-receiving signals from adjoining light-receiving elements of the first light detector 235A which are positioned symmetrically to the certain adjoining light-receiving elements with respect to the image-forming point. Incidentally, an analogue switch may be provided to, for instance, the first maximum-value selector 13 of the posterior pinhole-signal operational circuit 236B, in order to determine which one of the first maximum-value selector 13 of the anterior pinhole-signal operational circuit 236A and the first maximum-value selector 13 of the posterior pinhole-signal operational circuit 236B is to be used in the selection of the maximum value.

The error-signal operational circuit 238 outputs a difference between the anterior pinhole signal from the anterior pinhole-signal operational circuit 236A and the posterior pinhole signal from the posterior pinhole-signal operational circuit 236B to the servo circuit 240 as a signal based on the amount of the displacement between the focal point of the objective lens 170 and the measuring face (focusing-error signal).

The servo circuit 240 controls the actuator 200 based on the focusing-error signal from the error-signal operational circuit 238 for adjusting the position of the focusing lens 130. In other words, the position of the focusing lens 130 is adjusted so that the convergent light from the objective lens 170 forms an image on the measuring face 901.

Operation(s) and Advantage(s) of Optical Displacement Measuring Instrument

Light outputted from the light source 110 is collimated by the first collimating lens 120 to be parallel light, and subsequently incident on the focusing lens 130 to be diverging light. The diverging light from the focusing lens 130 is incident on the second collimating lens 150 to be collimated to be parallel light. The parallel light from the second collimating lens 150 is turned into convergent light by the objective lens 170 and illuminated on the measuring face 901.

Reflected light from the measuring face 901 passes through the objective lens 170, the second collimating lens 150, the focusing lens 130 and the first collimating lens 120. The reflected light is subsequently guided by the first beam splitter 233 to the focal-point detecting optical system 231.

In the focal-point detecting optical system 231, the reflected light is split by the second beam splitter 234 into two split light, and the two split light are subsequently received by the first light detector 235A and the second light detector 235B respectively. Then, in the focal-point detecting circuit 232, the total value of the light-receiving signals from all the light-receiving elements p1 to p17 is obtained for each of the first light detector 235A and the second light detector 235B. In other words, the calculation of $p1+p2+p3 \ldots +17$ is conducted.

Also, the sums of the light-receiving signals from the three adjoining light-receiving elements (p17, p2, p3), (p2, p3, p4), ... and (p16, p17, p2) are obtained. In other words, the sums are obtained by conducting calculations of $p17+p2+p3$, $p2+p3+p4$, ... and $p16+p17+p2$ respectively. Subsequently, the maximum value selected from these sums is subtracted from the total value to obtain each of the anterior pinhole signal and the posterior pinhole signal.

Then, the error-signal operational circuit 238 obtains a difference between the anterior pinhole signal and the posterior pinhole signal, and outputs the obtained difference between the pinhole signals to the servo circuit 240 as a signal based on the amount of the displacement between the focal point and the measuring face (focusing-error signal).

The servo circuit 240 drives the actuator 200 and controls the position of the focusing lens 130 so that the pinhole signals of the first light detector 235A and the second light detector 235B become equal to each other.

With this arrangement, since the focusing lens 130 is moved in accordance with a profile of the measuring face so that the focal point of the objective lens 170 is brought into coincidence with the measuring face 901, the profile of the measuring face 901 can be measured by reading the position of the focusing lens 130 with the linear encoder 210.

The convergent light illuminated on the measuring face 901 is specularly and diffusely reflected on the measuring face 901. The specularly-reflected light and the diffusely-reflected light pass through the objective lens 170 and the like to be subsequently received by the first light detector 235A and the second light detector 235B.

When the measuring face 901 is slanted and an angle between an outer edge of the convergent light and the reflected light (specularly-reflected light) from the measuring face 901 is approximately zero, the specularly-reflected light is only partially received by the first light detector 235A and the second light detector 235B. At this time, false focusing may generate a bulging and a recess that are not present in the profile of the measuring face.

In this exemplary embodiment, the pinhole signal of each of the first light detector 235A and the second light detector 235B is obtained by subtracting the maximum value of the sums of the light-receiving signals from the adjoining light-receiving elements (i.e., a sum of light-receiving signals from adjoining light-receiving elements that have received the specularly-reflected light) from the total value of the light receiving signals from all the light-receiving signals p1 to p17. Therefore, correct focusing can be conducted. In other words, focusing is conducted based on the darker diffusely-reflected light with exclusion of the specularly-reflected light from the measuring face (i.e., with the specularly-reflected light masked). Thus, correct focusing can be conducted. Accordingly, it is possible to prevent a bulging and a recess that are not present in the profile of the measuring face from being generated by false focusing.

In addition, since the maximum value of the sums of the light-receiving signals from the adjoining sets of the light-receiving elements p1 to p17 included in each of the first light detector 235A and the second light detector 235B is excluded from the total value, the following advantages can be also obtained: (a) it is possible to prevent discontinuous masking of pixels due to speckle, diffraction and the like; (b) it is not required to prepare a complex digital circuit for selecting the pixels to be masked; and (c) even when a measuring instrument that uses doughnut-shaped beam is used and the measuring face is slanted at an angle smaller than the limit angle, the entire beam is not masked.

Figure 4:
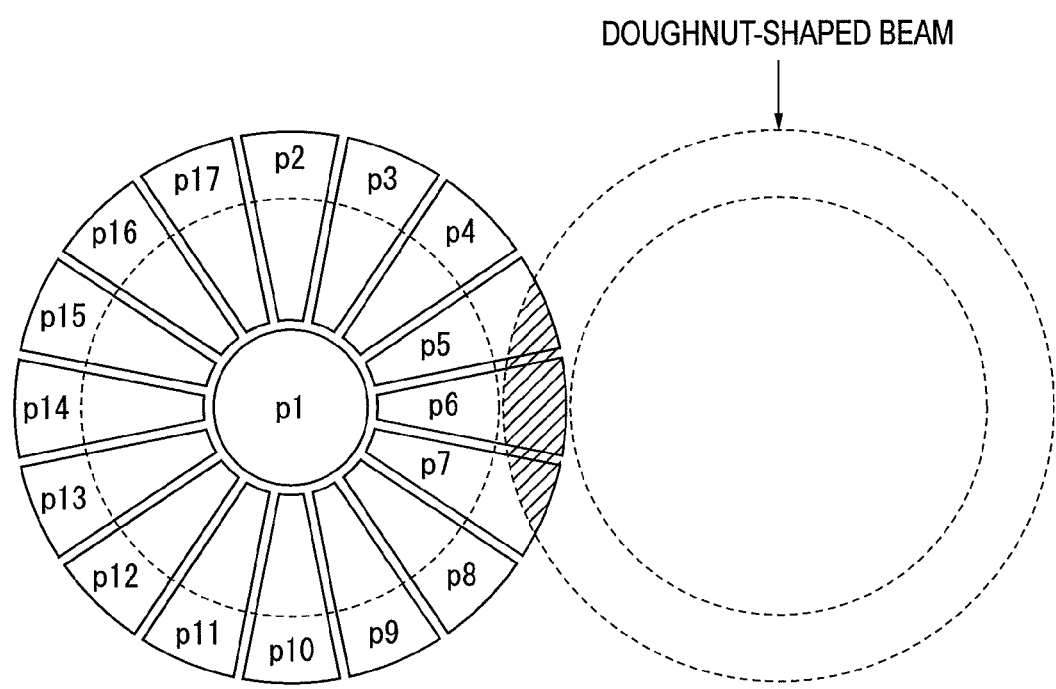
FIG. 4 shows a measurement of a measuring face slanted at a limit angle according to the exemplary embodiment.

For instance, FIG. 4 shows a state when a gauge that uses doughnut-shaped beam is used and the measuring face is slanted at the limit angle. In the state shown in FIG. 4, the sum of the light-receiving signals from the light-receiving elements p5 to p7 that have received the specularly-reflected light is selected as the maximum value and excluded (masked) from the total value. Thus, it is understood that no matter in which direction the measuring face is slanted, the specularly-reflected light can be reliably shielded. At this time, since the remaining light-receiving elements p1 to p4 and p8 to p17 are capable of receiving the diffusely-reflected light, it is possible to conduct focusing.

Figure 5:
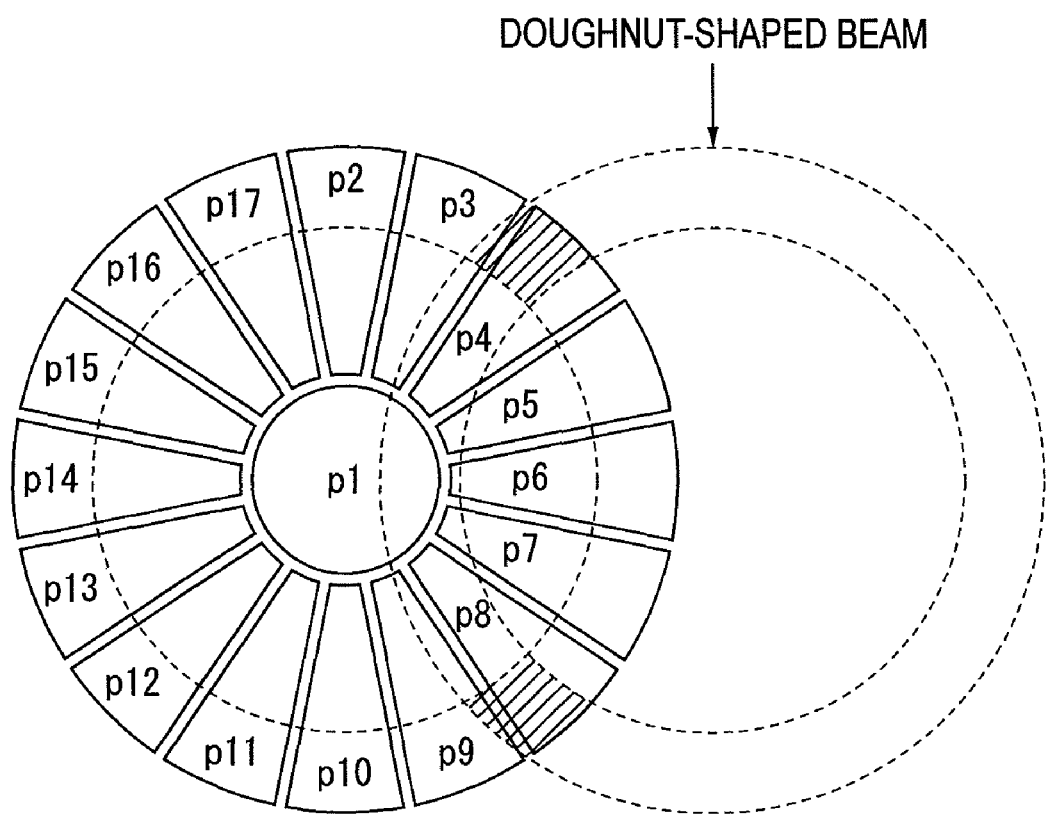
FIG. 5 shows a measurement of the measuring face slanted at an angle smaller than the limit angle according to the exemplary embodiment.

On the other hand, FIG. 5 shows a state when the measuring face is slanted at an angle smaller than the limit angle. In this state where the reflected light is received at two positions, while the light received at one position is shielded (masked), the light received at the other position can be used for focusing. Thus, unlike conventional arrangements, it is possible to prevent the majority of the beam from being masked when doughnut-shaped beam is used.

Further, in each of the first light detector 235A and the second light detector 235B, the plurality of fan-shaped light-receiving elements p2 to p17 are annularly arranged in an adjoining manner. Thus, no matter in which direction the measuring face is slanted, correct focusing can be conducted. In other words, errors due to slant of the measuring face can be reduced.

In addition, since the first light detector 235A and the second light detector 235B are each provided by a 17-part split photodiode, a commercially-available split photodiode is usable, thereby contributing to cost reduction. The use of a photodiode allows an analogue-circuit processing and high-speed processing. Thus, responsiveness is not reduced. For comparison, a conventional arrangement (arrangement disclosed in the document 2), for which a digital circuit is indispensable, requires the use of light-receiving elements such as low-speed CCD or C-MOS, so that the responsiveness may be reduced. However, this exemplary embodiment is free from such responsiveness reduction.

It should be understood that the invention is not limited to the above-described exemplary embodiment(s) but may include such modifications and improvements as are compatible with the invention.

While the optical system according to the above exemplary embodiment includes the light source 110, the first collimating lens 120, the focusing lens 130, the second collimating lens 150 and the objective lens 170, the arrangement is not limited thereto.

Figure 6:
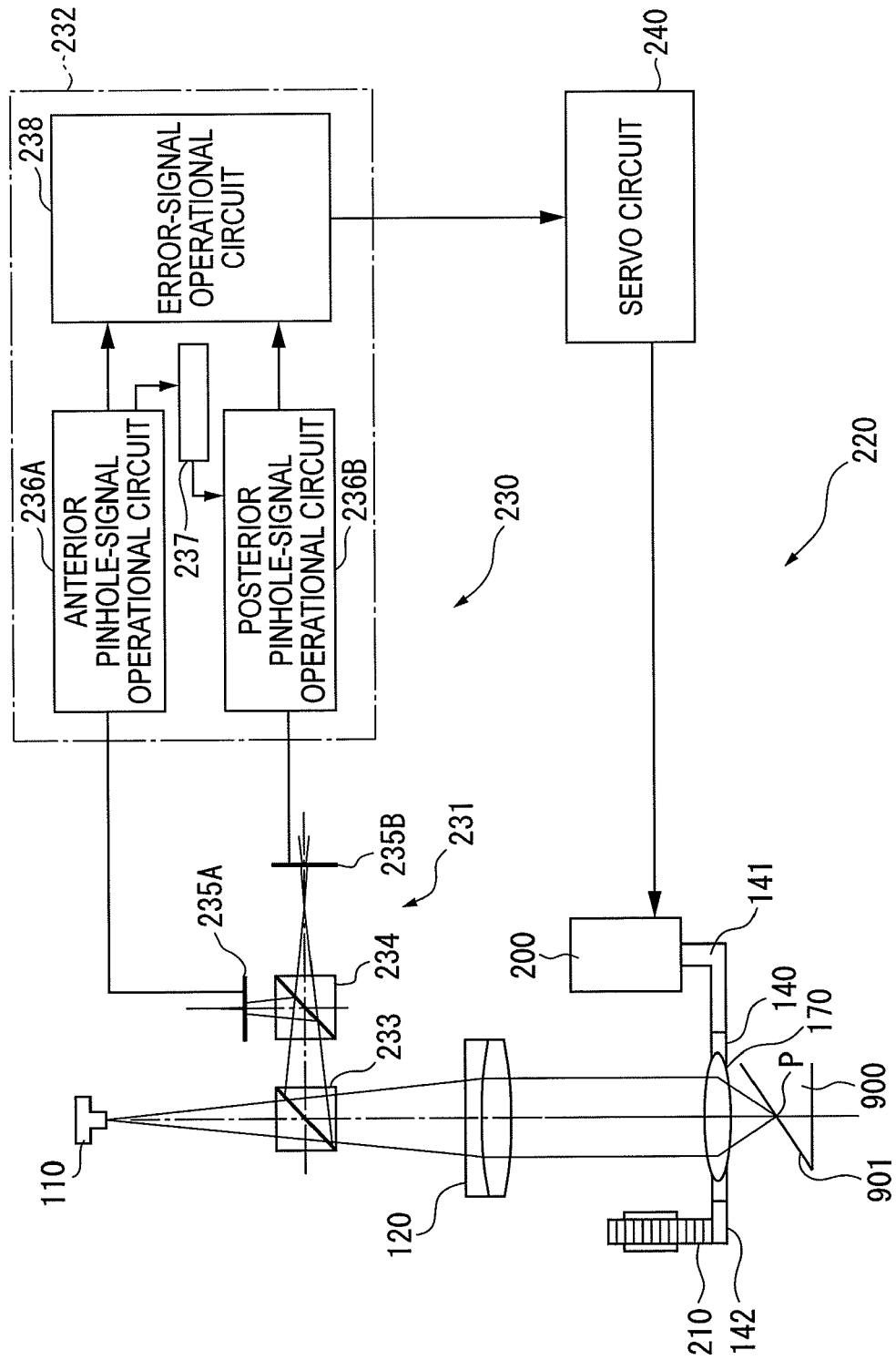
FIG. 6 conceptually shows a modification of the exemplary embodiment.

For instance, an arrangement shown in FIG. 6 may be employed. This arrangement includes the light source 110, the first collimating lens 120 and the objective lens 170 for converging parallel light outputted from the first collimating lens 120, illuminating the converged light onto the measuring face 901 of a target object 900 and receiving reflected light from the measuring face 901.

The periphery of the objective lens 170 is supported by the lens holder 140. The lens holder 140 is linked to the actuator 200 via the arm 141 and also linked to the linear encoder 210 via the connector 142.

In other words, compared with the above exemplary embodiment, the focusing lens 130 and the second collimating lens 150 are not provided in this arrangement. Accordingly, the objective lens 170 is movable in the optical axis direction, and a position of the objective lens 170 is detectable with the linear encoder 210.

According to this modification, the focusing unit 220 recognizes the positional displacement between the focal point of the objective lens 170 and the measuring face 901 based on the reflected light that has been reflected from the measuring face 901 and has passed through the objective lens 170, and drives the actuator 200 to move the objective lens 170 in the optical axis direction so that the focal point of the objective lens 170 is brought into coincidence with the measuring face 901. Accordingly, by reading the position of the objective lens 170 with the linear encoder 210, the profile of the measuring face 901 can be measured.

While each of the first light detector 235A and the second light detector 235B is provided by a 17-part split photodiode in the above exemplary embodiment and the modification (FIG. 6), the number of the split parts in each of the first light detector 235A and the second light detector 235B is not limited thereto. The number of the split parts is only required to be at least three or more, preferably four or more.

Figure 7:
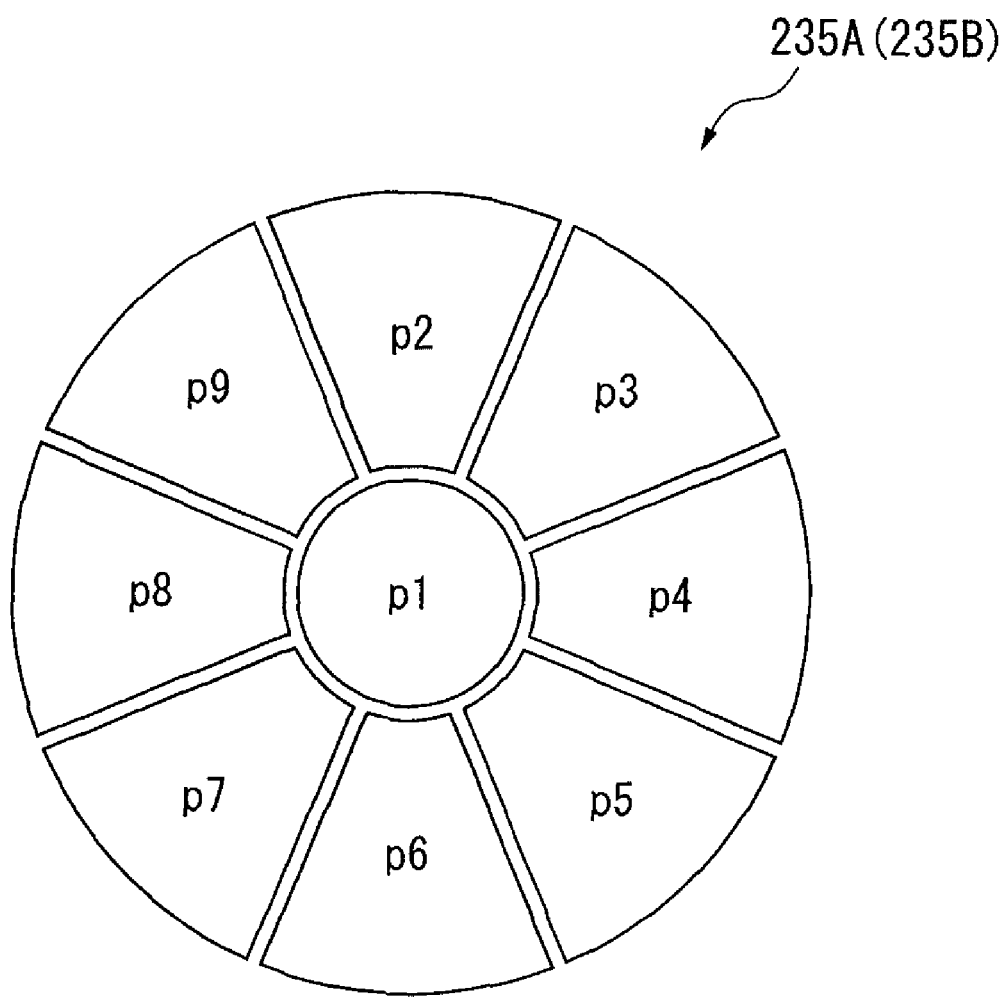
FIG. 7 shows a modification of the light-receiving element of the light detector in the exemplary embodiment.

For instance, as shown in FIG. 7, a 9-part split photodiode is usable.

While the circular light-receiving element p1 is centrally disposed and the plurality of fan-shaped light-receiving elements p2 to p17 or p2 to p9 are annularly arranged around the light-receiving element p1 in an adjoining manner in the above exemplary embodiment and the modification shown in FIG. 7, the central circular light-receiving element p1 may not be provided.

Figure 8A:
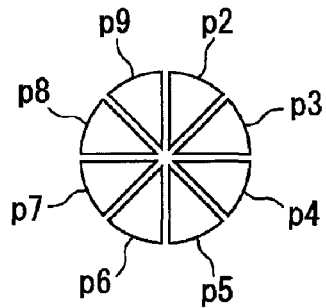
FIG. 8A shows another modification of the light-receiving element of the light detector in the exemplary embodiment.

For instance, as shown in FIG. 8A, three or more fan-shaped light-receiving elements p2 to p9 (in this example, eight elements) may be annularly arranged in an adjoining manner. The fan-shaped light-receiving elements p2 to p9 used in such an arrangement are each shaped in a typical sector of which inner end is not cut away.

When the circular light-receiving element p1 is provided at the center of the light-receiving region, the beam having been lessened due to defocusing is not hidden in a gap between the light-receiving elements at the time of alignment of pseudo-pinhole, so that the beam is easily adjustable. In addition, the inner ends (central portions) of the fan-shaped light-receiving elements p2 to p17 do not have to be sharpened by machining, so that the arrangement provided with the circular light-receiving element p1 is free from a phenomenon that the light-receiving signals are easily affected by the machining accuracy (machining shape) of the inner ends (central portions) of the light-receiving elements p2 to p17.

Figure 8B:
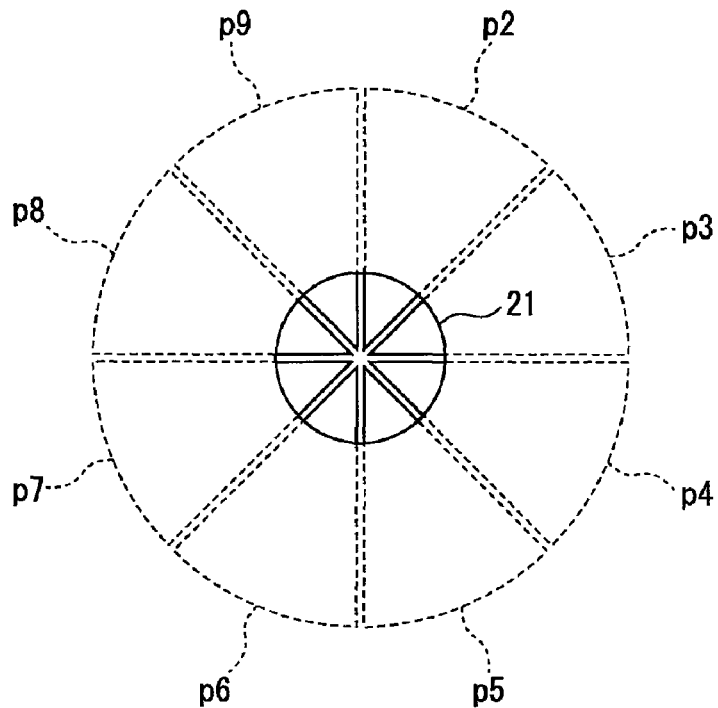
FIG. 8B shows another modification of the light-receiving element of the light detector in the exemplary embodiment.
Figure 8C:
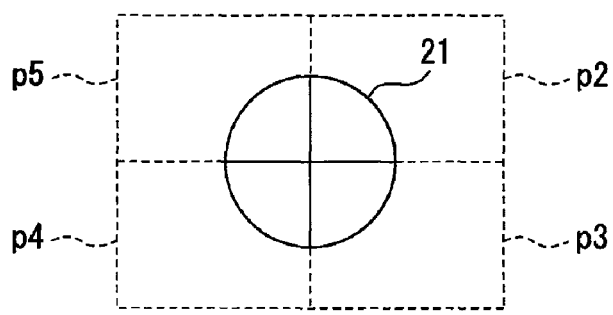
FIG. 8C shows another modification of the light-receiving element of the light detector in the exemplary embodiment.
Figure 9:
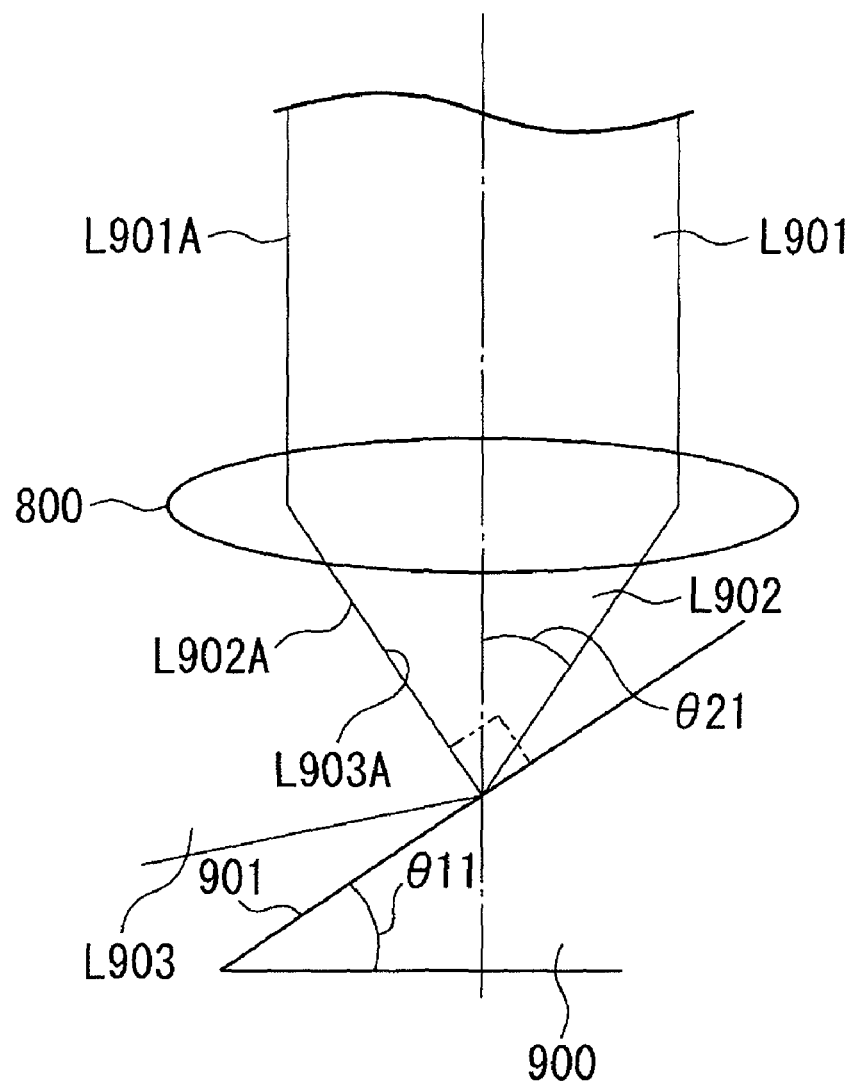
FIG. 9 conceptually shows a measurement with a conventional arrangement in which a slanting angle of a measuring face and a convergent angle of convergent light are equal to each other.
Figure 10:
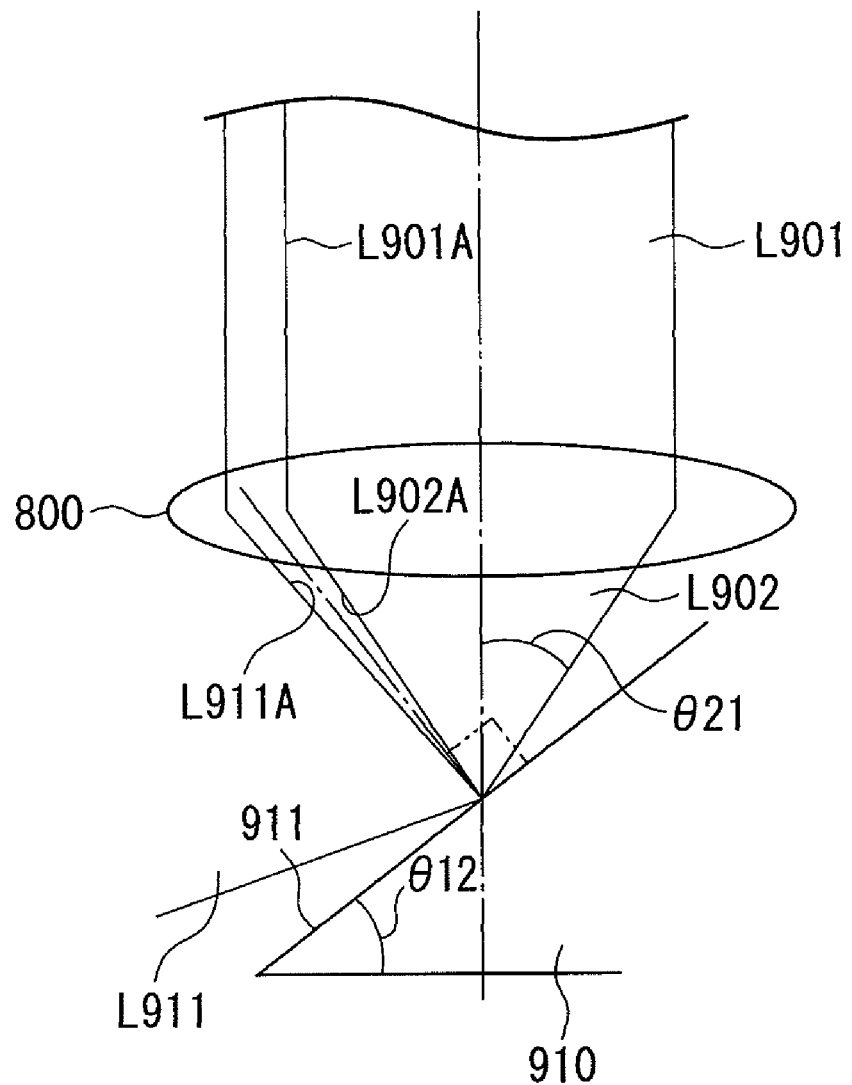
FIG. 10 conceptually shows a measurement with a conventional arrangement in which the slanting angle of the measuring face is larger than the convergent angle of the convergent light.

In the above exemplary embodiment and the modifications shown in FIGS. 7 and 8A, the light-receiving elements p2 to p17 or p2 to p9 are annularly arranged in an adjoining manner within the pseudo-pinhole-equivalent circle, so that outer diameters of the light-receiving elements p2 to p17 or p2 to p9 serve to define the circular light-receiving region. However, as shown in FIG. 8B, with three or more fan-shaped light-receiving elements p2 to p9 (in this example, eight elements) being annularly arranged in an adjoining manner, a pinhole 21 may be placed in front of the light-receiving elements p2 to p9 so as to provide the circular light-receiving region. Further, the light-receiving elements p2 to p9 shown in FIG. 8 may not be circular. For instance, as shown in FIG. 8C, the pinhole 21 may be placed at the center of a 4-part split photodiode structured such that a rectangular light-receiving region is split into four parts (i.e., into four light-receiving elements p2 to p5).

Alternatively, a metal-deposited film may be formed on a transparent resin film coating the surface of the light-receiving elements p2 to p9 of the photodiode, and by providing a pinhole-equivalent circle on the metal-deposited film, the light-receiving region may be provided within the pinhole-equivalent circle.

While the sums of the light-receiving signals from the three adjoining light-receiving elements among the fan-shaped light-receiving elements p2 to p17 are obtained in the above exemplary embodiment, the number of the light-receiving elements used for obtaining the sum is only required to be two or more. The number of the light-receiving elements used for obtaining the sum may be suitably determined depending on the number of the split light-receiving elements included in each of the first light detector 235A and the second light detector 235B. For instance, when the number of the split parts shown in FIG. 7 or 8A to 8C is concerned, the sums of the light-receiving signals from two adjoining light-receiving elements may be obtained.

The entire disclosure of Japanese Patent Application No. 2008-155283, filed Jun. 13, 2008, is expressly incorporated by reference herein.

What is claimed is:

1. An optical displacement measuring instrument, comprising:
    a light source;
    a collimating lens that collimates light from the light source and outputs the light as parallel light;
    an objective lens that converges the parallel light from the collimating lens, illuminates the converged light onto a measuring face of a target object and receives reflected light from the measuring face;
    a moving unit that moves the objective lens or a focusing lens disposed between the objective lens and the light source along an optical axis;
    a position detector that detects a position of the objective lens or a position of the focusing lens; and
    a focusing unit that recognizes a positional displacement between a focal point of the objective lens and the measuring face based on reflected light and drives the moving unit to bring the focal point of the objective lens into coincidence with the measuring face, the reflected light having been reflected on the measuring face and having passed though the objective lens, wherein
    the focusing unit comprises: a light splitter for splitting the reflected light having been reflected on the measuring face and having passed through the objective lens into two split light of first reflected light and second reflected light; a first light detector and a second light detector respectively disposed anterior to an image-forming point of the first reflected light and posterior to an image-forming point of the second reflected light, a plurality of light-receiving elements being arranged in a manner adjoining to each other along at least an outer circumference of a light-receiving region in each of the first light detector and the second light detector; a focal-point detector that obtains an amount of displacement between the focal point of the objective lens and the measuring face based on a light-receiving signal obtained with the first light detector and a light-receiving signal obtained with the second light detector; and a servo circuit for driving the moving unit so that the amount of the displacement obtained by the focal-point detector is canceled, the driving of the moving unit bringing the focal point of the objective lens into coincidence with the measuring face, and
    the focal-point detector comprises: a first maximum-value selector that selects a maximum value from sums of the light-receiving signals from adjoining light-receiving elements of either one of the first light detector and the second light detector; a second maximum-value selector that deems a sum of the light-receiving signals from adjoining light-receiving elements of the other one of the first light detector and the second light detector as a maximum value and selects the deemed sum as the maximum value, the adjoining light-receiving elements of the other one of the first light detector and the second light detector being positioned symmetrically to the adjoining light-receiving elements that provide the maximum value selected by the first maximum-value selector with respect to the image-forming point; a total-value operator that obtains a total value of the light receiving signals from all the light-receiving elements of each of the first light detector and the second light detector; a light-detecting-signal operator that obtains a light-detecting signal by subtracting the maximum value from the total value for each of the first light detector and the second light detector; and an error-signal operator that outputs the difference between the light-detecting signals obtained by the light-detecting-signal operator to the servo circuit as a signal based on the amount of the displacement between the focal point and the measuring face.

2. The optical displacement measuring instrument according to claim 1, wherein a plurality of fan-shaped light-receiving elements are annularly arranged in an adjoining manner in each of the first light detector and the second light detector.

3. The optical displacement measuring instrument according to claim 2, wherein each of the first light detector and the second light detector is provided by a split photodiode.

4. The optical displacement measuring instrument according to claim 1, wherein each of the first light detector and the second light detector includes three or more light-receiving elements.

5. The optical displacement measuring instrument according to claim 2, wherein each of the first light detector and the second light detector includes three or more light-receiving elements.

6. The optical displacement measuring instrument according to claim 3, wherein each of the first light detector and the second light detector includes three or more light-receiving elements.

* * * * *